(12) United States Patent
Sherwood (10) Patent No.: US 8,534,933 B2
(45) Date of Patent: Sep. 17, 2013

(54) SYSTEM FOR STORING AND RELEASING A CAMERA FOR QUICK USE

(76) Inventor: Brent Wayne Sherwood, Amarillo, TX (US)

( * ) Notice: Subject to any disclaimer, the term of this patent is extended or adjusted under 35 U.S.C. 154(b) by 0 days.

(21) Appl. No.: 13/026,264

(22) Filed: Feb. 13, 2011

(65) Prior Publication Data

US 2012/0207464 A1 Aug. 16, 2012

(51) Int. Cl.
*G03B 17/56* (2006.01)

(52) U.S. Cl.
USPC .......................................... 396/428; 396/348

(58) Field of Classification Search
CPC ........................................................ G03B 17/56
USPC .......... 348/231.7, 281, 302, 375; 248/187.1; 341/347; 361/679.58, 728; 396/348, 486–488, 396/519, 528, 419–428
See application file for complete search history.

(56) References Cited

U.S. PATENT DOCUMENTS

| | | | | |
|---|---|---|---|---|
| 2,279,443 A | * | 4/1942 | Chanosky | 396/329 |
| 2,483,711 A | | 10/1946 | Roos | |
| 2,413,272 A | * | 12/1946 | Wheelwright | 396/428 |
| 3,291,179 A | * | 12/1966 | Lang | 206/316.2 |
| 3,966,101 A | * | 6/1976 | Taylor, III | 224/219 |
| 4,341,452 A | * | 7/1982 | Korling | 396/428 |
| 4,733,259 A | * | 3/1988 | Ng | 396/419 |
| 5,081,478 A | * | 1/1992 | Hayashida et al. | 396/425 |
| 5,612,515 A | * | 3/1997 | Eisen | 177/126 |
| 5,828,917 A | * | 10/1998 | Stephenson | 396/424 |
| 6,184,804 B1 | * | 2/2001 | Harrison | 341/22 |
| 6,330,961 B1 | * | 12/2001 | Borja | 224/222 |
| 6,899,255 B2 | * | 5/2005 | Pringle | 224/221 |
| 6,955,484 B2 | * | 10/2005 | Woodman | 396/423 |
| 7,272,423 B2 | * | 9/2007 | Satoh et al. | 455/575.3 |
| 7,273,321 B2 | * | 9/2007 | Woodman | 396/420 |
| 7,422,379 B2 | * | 9/2008 | Agevik et al. | 396/424 |
| 7,458,736 B2 | * | 12/2008 | Woodman | 396/420 |
| 7,549,807 B2 | * | 6/2009 | Nazarian | 396/420 |
| 7,726,887 B2 | * | 6/2010 | Su et al. | 396/423 |
| 7,780,126 B2 | * | 8/2010 | Law et al. | 248/168 |
| 7,853,299 B2 | * | 12/2010 | Kang et al. | 455/575.3 |
| 7,958,602 B2 | * | 6/2011 | Nishizawa et al. | 16/367 |
| 8,002,480 B2 | * | 8/2011 | Polster | 396/425 |
| 8,016,492 B2 | * | 9/2011 | Pyle | 396/423 |
| 2003/0044180 A1 | * | 3/2003 | Lindberg | 396/420 |
| 2003/0094385 A1 | * | 5/2003 | Moldovan | 206/38 |
| 2004/0200868 A1 | * | 10/2004 | Woodman | 224/221 |

(Continued)

*Primary Examiner* — Clayton E Laballe
*Assistant Examiner* — Kevin Butler
(74) *Attorney, Agent, or Firm* — Shannon L. Warren (57) ABSTRACT

A first system for mounting a camera to an arm is disclosed. Specifically, the first system comprises a bracket system, an arm mount, and a hinge system. Said bracket system is capable of supporting a camera. Said hinge system comprises a clasping device having a first portion and a second portion. Said hinge system connects said bracket system and said arm mount, and said first portion and said second portion of said clasping device are capable of selectively releasing and reattaching to one another and thereby release and reattach said bracket system and said arm mount. Further, a second system for mounting a camera to an arm is disclosed. Specifically, the second system comprises a bracket system, an arm mount, and a hinge system having a bending point. Said bracket system is capable of supporting a camera. Said hinge system connects said bracket system and said arm mount. Said hinge system comprises a flexible portion comprising a flexible material. Said bending point is in said flexible portion. And, finally, said bending point serves as a pivot point for said hinge system.

20 Claims, 8 Drawing Sheets

(56) References Cited

U.S. PATENT DOCUMENTS

| | | | |
|---|---|---|---|
| 2005/0270732 A1* | 12/2005 | Titzler et al. | 361/681 |
| 2006/0008269 A1* | 1/2006 | Woodman | 396/423 |
| 2006/0055607 A1* | 3/2006 | Satoh et al. | 343/702 |
| 2006/0097927 A1* | 5/2006 | Satoh et al. | 343/702 |
| 2006/0162122 A1* | 7/2006 | Satoh et al. | 16/221 |
| 2006/0264792 A1* | 11/2006 | Bonn | 602/21 |
| 2007/0122141 A1* | 5/2007 | Agevik et al. | 396/419 |
| 2007/0149260 A1* | 6/2007 | Satoh et al. | 455/575.1 |
| 2008/0146295 A1* | 6/2008 | Jorgensen et al. | 455/575.3 |
| 2008/0240705 A1* | 10/2008 | Nazarian | 396/420 |
| 2009/0057356 A1* | 3/2009 | Woodman | 224/219 |
| 2009/0103261 A1* | 4/2009 | Shih | 361/679.58 |
| 2009/0280861 A1* | 11/2009 | Khan | 455/556.1 |
| 2010/0006518 A1* | 1/2010 | Brobst | 211/26 |
| 2010/0316369 A1* | 12/2010 | Pyle | 396/423 |
| 2011/0069947 A1* | 3/2011 | Orf | 396/419 |
| 2011/0077061 A1* | 3/2011 | Danze et al. | 455/575.1 |
| 2011/0199728 A1* | 8/2011 | Reyes | 361/679.31 |
| 2011/0301520 A1* | 12/2011 | Summit et al. | 602/16 |

\* cited by examiner

SYSTEM FOR STORING AND RELEASING A CAMERA FOR QUICK USE

BACKGROUND

This disclosure relates to a system for a camera arm mount system.

Today, cameras are smaller, cheaper and produce better quality pictures than ever before. As a consequence more and more people carry cameras to capture moments while on vacation and in their daily lives. In some situations, such as during an important event or at a particular location, a user may wish to take many photos. However, the user may also need the use of his or her hands, forcing the user to store and remove the camera between uses. To alleviate this problem, a few solutions have been offered. One current solution includes attaching a rope loop to the camera, capable of sliding over a wrist. Another solution is to place a neckband on the camera to allow the camera to hang around the user's neck. Still another solution includes mounting a case to a belt buckle.

However, each solution mentioned above has problems associated with it. The rope loop often is too loose, and even when fitted snugly, still allows the camera to hang down, exposing it to damage, or requiring the user to hold the camera. The neckband also allows the camera to hang freely, exposing the camera to greater risk of damage, particularly if the user is in an active environment. A belt loop mounted case protects the camera, but can be bulky and requires extra time to take out the camera.

It would therefore be advantageous to implement a camera arm mount system.

SUMMARY

A system for mounting a camera to an arm is disclosed. Specifically, the first system comprises a bracket system, an arm mount, and a hinge system. Said bracket system is capable of supporting a camera. Said hinge system comprises a clasping device having a first portion and a second portion. Said hinge system connects said bracket system and said arm mount, and said first portion and said second portion of said clasping device are capable of selectively releasing and reattaching to one another and thereby release and reattach said bracket system and said arm mount.

DETAILED DESCRIPTION

Described herein is a camera arm mount system. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any project), numerous design decisions must be made to achieve the designer' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the applicable art. Accordingly, the claims appended hereto are not intended to be limited by the disclosed embodiments, but are to be accorded their widest scope consistent with the principles and features disclosed herein.

Figure 1:
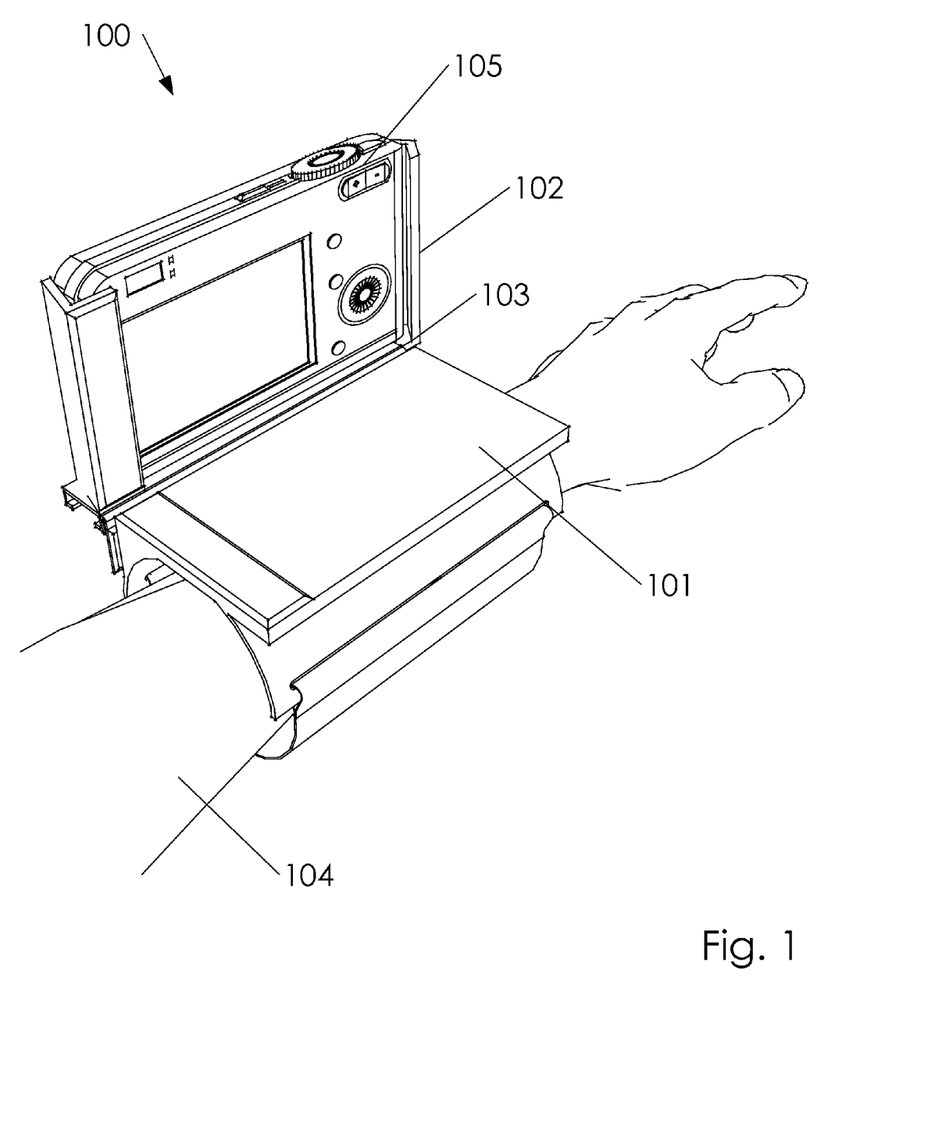
FIG. 1 illustrates a camera arm mount system.

FIG. 1 illustrates a camera arm mount system 100. Camera arm mount system 100 can comprise an arm mount 101, a bracket system 102, and a hinge system 103. Hinge system 103 can comprise several embodiments such as a hinge system 103a (illustrated in FIG. 5A) and an alternate hinge system 103b.(illustrated in FIG 5B). Arm mount 101 can attach to an arm 104 of a user. In one embodiment, bracket system 102 can support a camera 105. In one embodiment, hinge system 103 can connect bracket system 102 to arm mount 101. In one embodiment, hinge system 103 can be configured to detach and reattach bracket system 102 from arm mount 101.

Figure 2:
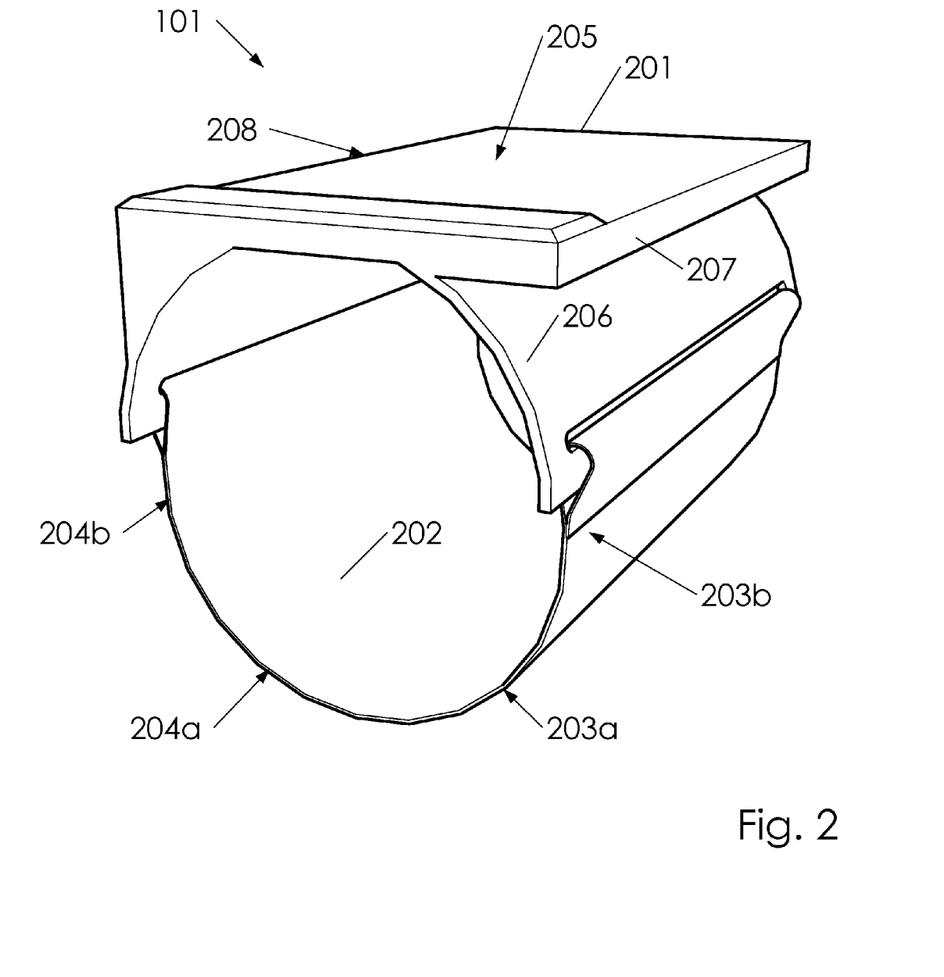
FIG. 2 illustrates a first view of an arm mount.

FIG. 2 illustrates a first view of arm mount 101 FIG. 1. Arm mount 101 FIG. 1 can comprise a non-use support 201 for camera 105, and an armband 202. In one embodiment, non-use support 201 and armband 202 are formed from substantially the same piece of material. In another embodiment, non-use support 201 and armband 202 can be two or more different pieces of material. In such embodiment, armband 202 can affix arm mount 101 FIG. 1 to arm 104 in a number of ways. In one embodiment, armband 202 can comprise a first side 203 and a second side 204. First side 203 can comprise a bottom portion 203a and a top portion 203b. Second side 204 can comprise can comprise a bottom portion 204a and a top portion 204b. Non-use support 201 can comprise a top surface 205, a first side 207, and a second side 208. Non-use support 201 can further comprise a subsurface 206, existing below and attached to top surface 205.

In one embodiment, bottom portion 203a can comprise a set of one or more fasteners capable of mating with a set of one or more fasteners on a bottom side 204a. Examples of fasteners capable of mating include, but are not limited to, watchstraps and buckles, buttons, clasps, and corresponding hook-and-loop portions (such as Velcro®). In one embodiment, the first and second side of armband 202 can be a single article capable of stretching over and around arm 104, as shown in FIG. 2. In one embodiment, armband 202 can comprise an elastic material. In another embodiment, top portion 203b and top portion 204b can connect to non-use support 201. In such embodiment, top portion 203b and top portion 204b can connect to opposite sides of non-use support 201. In another configuration, top portion 203b and top portion 204b can be connected to form a single top portion. In one embodiment, top portion 204b can pass through an open portion of subsurface 206, loop back down and attach to armband 202. In one such embodiment, arm band 202 can be adjustably tightened to arm 104 depending on the position top portion 204b is attached to armband 202.

In one embodiment, top surface 205 can be a curved surface, in the general shape of the curvature of arm 104. In another embodiment, top surface 205 can be substantially flat. In one embodiment, top portion 203b and top portion 204b can connect to top surface 205. In another embodiment, top portion 203b and top portion 204b can connect to subsurface 206, as shown in FIG. 2.

Figure 3:
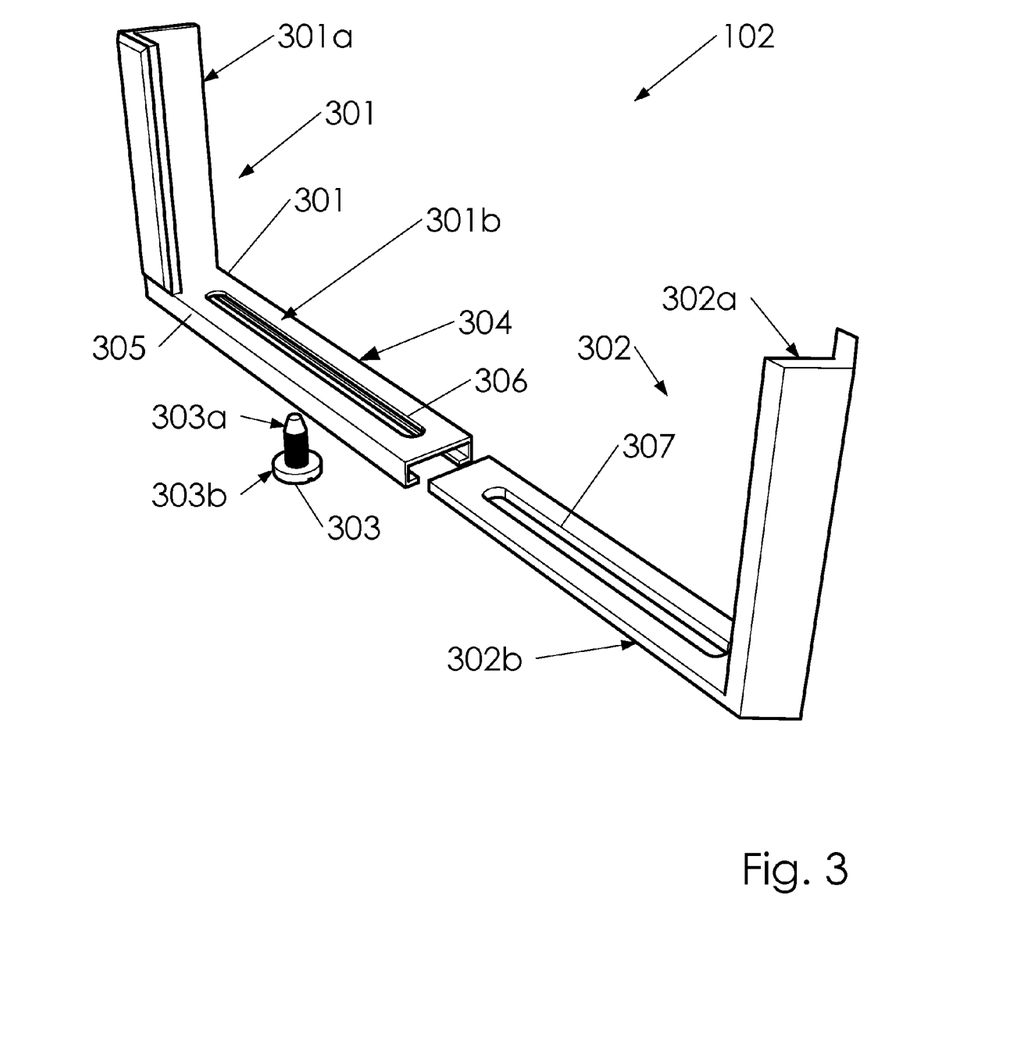
FIG. 3 illustrates a bracket system.

FIG. 3 illustrates bracket system 102 FIG. 1. Bracket system 102 FIG. 1 can comprise a first bracket 301, a second bracket 302, and/or a camera fastener 303. In one embodiment, bracket system 102 FIG 1 can comprise a single bracket capable of supporting a camera. In another embodiment, bracket system 102 FIG. 1 can comprise the combination of first bracket 301 and second bracket 302 capable of supporting a camera. Camera fastener 303 can comprise a camera fastener head 303a and a camera fastener body 303b. First bracket 301 can comprise a first side 304 and a second side 305. In one embodiment, bracket system 102 FIG. 1 can support camera 105. In one embodiment, bracket system 102 FIG. 1 can be configured to accommodate a variety of different cameras. In another embodiment, bracket system can be configured to accommodate a specific camera. In one embodiment, first bracket 301 can be substantially in the shape of an "L", wherein a side portion 301a and a bottom portion 301b form the two portions of the "L". In one embodiment, side portion 301a can comprise two connected substantially planar walls, one wall substantially parallel with the back of camera 105, and a second wall substantially parallel with a side of camera 105. In another embodiment, side portion 301a can be curved or substantially in the shape of a "V". In yet another embodiment, side portion 301a can be planar and substantially parallel with a side of camera 105.

In one embodiment, bottom portion 301b can be flat. In another embodiment, edges can be bent downward so as to form an upside down "U" shape. Still further, in another embodiment, bottom portion 301b edges can each be bent downward and inward, as shown in FIG. 3, to form a track for second bracket 302. Bottom portion 301b can comprise an aperture 306. In one embodiment, aperture 306 can extend along bottom portion 301b, aperture 306 having a length much longer than its width, as shown in FIG. 3.

Second bracket 302 can also be substantially in the shape of an "L", wherein a side portion 302a and a bottom portion 302b form the two portions of the "L". In one embodiment, side portion 302a can be planar and substantially parallel with a second side of camera 105. In another embodiment, side portion 302a can be curved or substantially in the shape of a "V". Bottom portion 302b can comprise an aperture 307. In one embodiment, aperture 307 can extend along the bottom portion 302b, aperture 307 having a length much longer than its width, as shown in FIG. 3. Second bracket 302 can align with first bracket such that at least a portion of aperture 306 and aperture 307 overlap. In one embodiment, aperture 306 and aperture 307 can each be a plurality of individual orifices, each large enough for only a portion of camera fastener 303 to pass through. In another embodiment, aperture 306 and aperture 307 can each vary in width intermittently to form interval positions at which only camera fastener head 303a can pass. In one embodiment, bottom portion 302b can slide inside a track formed by bended edges of bottom portion 301b.

Figure 4:
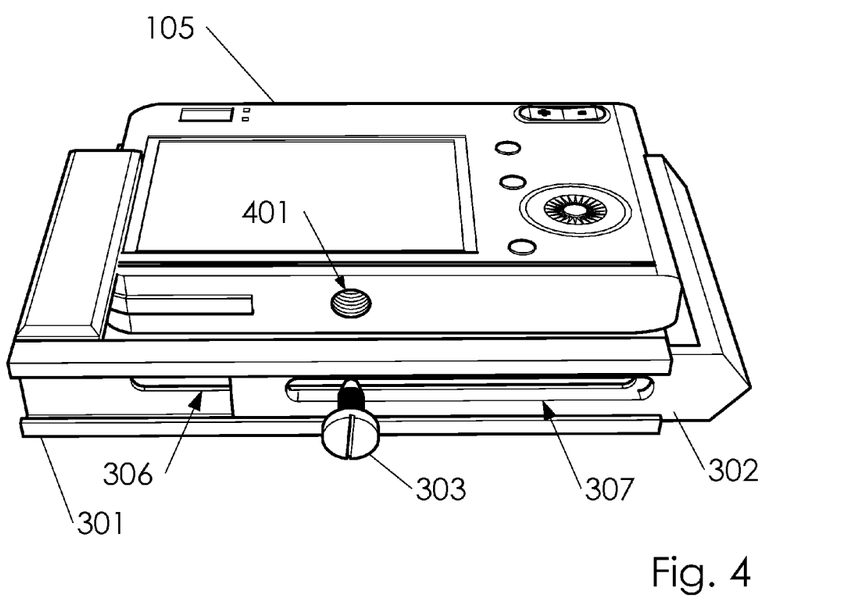
FIG. 4 illustrates a camera fastener interacting with a first bracket and a second bracket.

FIG. 4 illustrates camera fastener 303 interacting with first bracket 301 and second bracket 302. Camera 105 can comprise a camera fastener receiver 401, as is common in most cameras. In one embodiment, camera fastener body 303b and camera fastener receiver 401 can be threaded. In one embodiment, camera 105 can be attached to bracket system 102 FIG. 1 by inserting camera fastener body through aperture 306 and aperture 307, and securing camera fastener 303 into camera receiver 401. In one embodiment, camera fastener 303 can be secured either by screwing or some other secure fashion known in the art. In one embodiment, first bracket 301 and second bracket 302 can be pressed against each other when camera fastener 303 is secured into camera receiver 401. Further, in one embodiment, the pressure created from securing the camera fastener 303 in camera fastener receiver 401 compresses first bracket 301 against second bracket 302 such that second bracket 302 can no longer move freely relative to first bracket 301. In one embodiment, a washer can be placed between the camera fastener head 303a and bracket system 102 FIG. 1. Further, in one embodiment, at least a portion of each surface of first bracket 301 and second bracket 302 can have a high coefficient of friction where first bracket 301 and second bracket 302 touch, thereby creating grip. A high coefficient of friction can be achieved using a rough surface as opposed to a smooth surface, or a material such as rubber. In another embodiment, a washer can be placed between the camera fastener head 303a, first bracket 301, and/or second bracket 302. In such embodiment, such washer can be made of an elastic or deformable material, such as rubber.

In another embodiment, camera 105 can be held in bracket system 102 FIG. 1 by a combination of camera fastener 303, side portion 301a, and side portion 302a. In one embodiment, side portion 301a and side portion 302a restrain rotary movement of camera 105 about the central axis of camera fastener 303. In another embodiment, where bracket system 102 FIG. 1 comprises a single side portion, camera 105 can be held in bracket system 102 FIG. 1 by said single side portion and camera fastener 303.

Figure 5A:
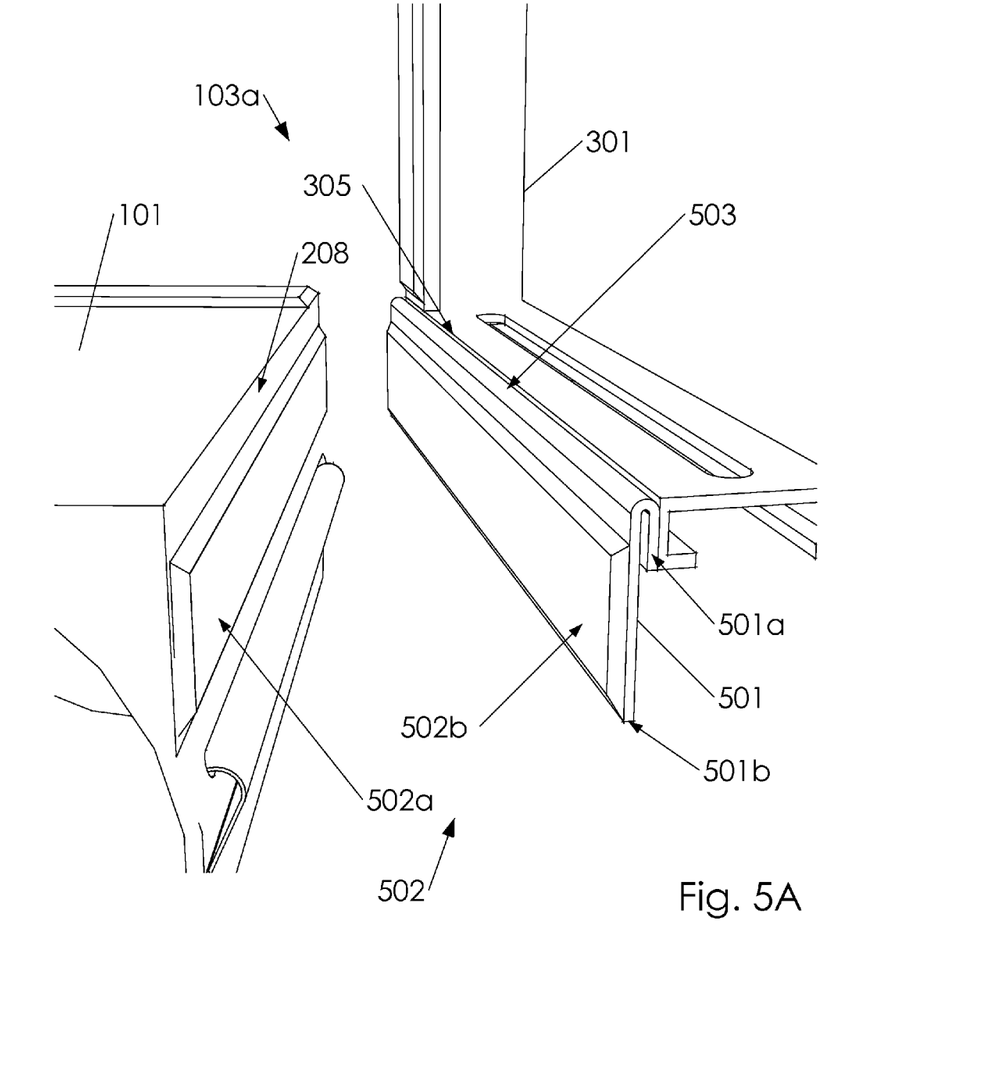
FIG. 5A illustrates a flexible portion system and a portion of camera arm mount system in a detached position.

FIG. 5A illustrates hinge system 103a and a portion of camera arm mount system 100 FIG. 1 in a detached position. Camera arm mount system 100 FIG. 1 can comprise an attached position where bracket system 102 FIG. 1 is attached to arm mount 101 FIG. 1, and said detached position where they are detached from one another. Hinge system 103a can comprise a flexible portion 501 and a plurality of clasping devices 502. Clasping devices 502 can comprise a first portion 502a and a second portion 502b. Flexible portion 501 can comprise a first portion 501a, a second portion 501b, and a bending point 503. In one embodiment, first portion 501a can attach to second side 305 and second portion 501b can attach to second portion 502b, as shown in FIG. 5A. In one embodiment, flexible portion 501 can be made of a flexible material such as leather, cloth, or rubber. In such embodiment, bending point 503 will naturally occur between first portion 501a and second portion 501b. In one embodiment, bending point 503 serves as a pivot point for hinge system 103a.

In one embodiment, clasping devices 502 can be used to attach and detach bracket system 102 FIG. 1 from arm mount 101 FIG. 1 . For example, in one embodiment, first portion 502a and second portion 502b can comprise opposite components of hook-and-loop fasteners, such as Velcro®. In such an embodiment, users of camera arm mount system 100 FIG. 1 could easily remove camera 105 (along with bracket system 102 FIG. 1 ) from arm mount 101 FIG. 1 by pulling first portion 502a apart from second portion 502b. Further, in such an embodiment, "pulling apart" can comprise applying adequate force to release first portion 502a from second portion 502b, causing the hooks and loops to release from one another without removing first portion 502a and second portion 502b from their respective underlying surfaces. Likewise, users could easily reassemble camera arm mount system 100 FIG. 1 by reattaching first portion 502a to second portion 502b. In one embodiment, clasping devices 502 can comprise a reusable adhesive material capable of attaching and detaching one or more times. In yet another embodiment, clasping devices 502 can comprise a set of magnets capable of attaching and detaching from one another.

Figure 5B:
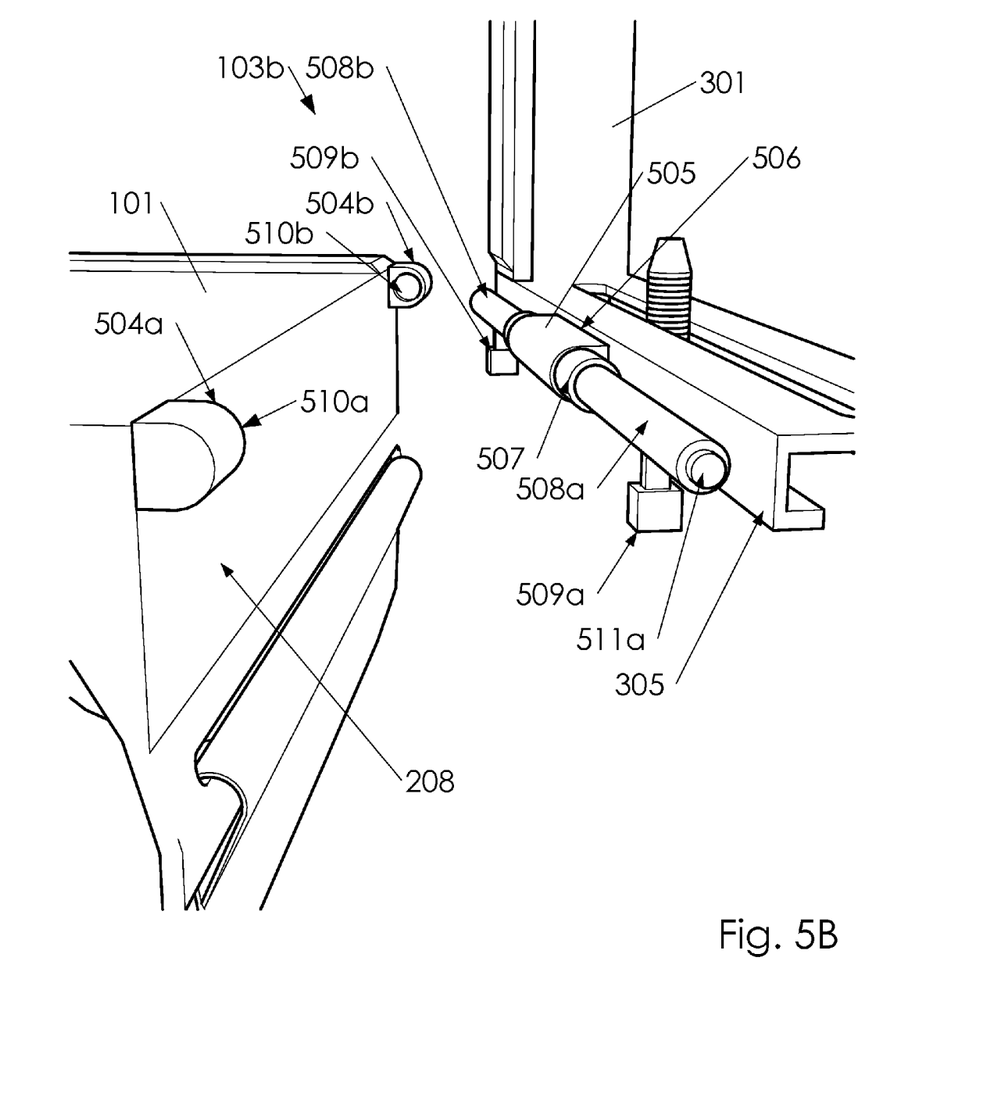
FIG. 5B illustrates an alternate hinge system and a portion of camera arm mount system in a detached position.

FIG. 5B illustrates alternate hinge system 103b and a portion of camera arm mount system 100 FIG. 1 in a detached position. Alternate hinge system 103b can comprise a first clasping device 504 and a second clasping device 505. In one embodiment, alternate hinge system 103b can attach arm mount 101 FIG. 1 to bracket system 102 FIG. 1. For example, in one embodiment, first clasping device 504 can be attached to second side 208 and second clasping device 505 can be attached to second side 305. Further, in another embodiment, first clasping device 504 can be attached to second side 305 and second clasping device 505 can be attached to second side 208.

First clasping device 504 can comprise a first end portion 504a and a second end portion 504b. Second clasping device 505 can comprise a middle portion 506, a sleeve 507, one or more connecting portions, and one or more release paddles. First end portion 504a can comprise a first socket 510a and second end portion 504b can comprise a second socket 510b. Connecting portions can comprise a first connector 508a and a second connector 508b. Release paddles can comprise a first release paddle 509a and a second release paddle 509b. In one embodiment, first end portion 504a and second end portion 504b can be arranged such that a first socket 510a and a second socket 510b face one another on a single axis.

In one embodiment, middle portion 506 can be attached to either second side 305 or second side 208. In one embodiment, sleeve 507 attaches to middle portion 506. In one embodiment, middle portion 506 wraps around and holds sleeve 507. In one embodiment, first connector 508a and second connector 508b attach at opposite ends of sleeve 507. In another embodiment, connecting portions be spring loaded into sleeve 507 such that connecting portions push outward and away from sleeve 507. In one such embodiment, connecting portions can be spring loaded by placing a spring inside of sleeve 507, inserting connecting portions into opposing ends of sleeve 506, compressing said spring, and providing a stop to keep connecting portions from sliding out of and apart from middle portion 507. In one embodiment, a first release paddle 509a can be attached to first connector 508a. In another embodiment, a second release paddle 509b can be attached to second connector 508b. In one embodiment, one or more release paddles can be pressed toward sleeve 507, against said spring load inside of sleeve 507, to reduce the length of second clasping device 505.

In one embodiment, connecting portions can each comprise a head 511 at their ends opposite the end inserted into sleeve 507. In one embodiment, the external circumference of heads 511 can be identical to or smaller than the internal circumference of sockets 510. In one embodiment, bracket system 102 FIG. 1 can be attached to arm mount 101 FIG. 1 by pressing one or more release paddles toward sleeve 507, inserting a first head 511a into first socket 510a, aligning second head 511b with second socket 510b, releasing one or more release paddles, and allowing second head 511b to insert into second socket 510b. Likewise, in one embodiment, bracket system 102 FIG. 1 can be removed from arm mount 101 FIG. 1 by pressing one or more release paddles toward sleeve 507, removing heads 511 from sockets 510, and allowing release paddles to return to their original position.

Figure 6:
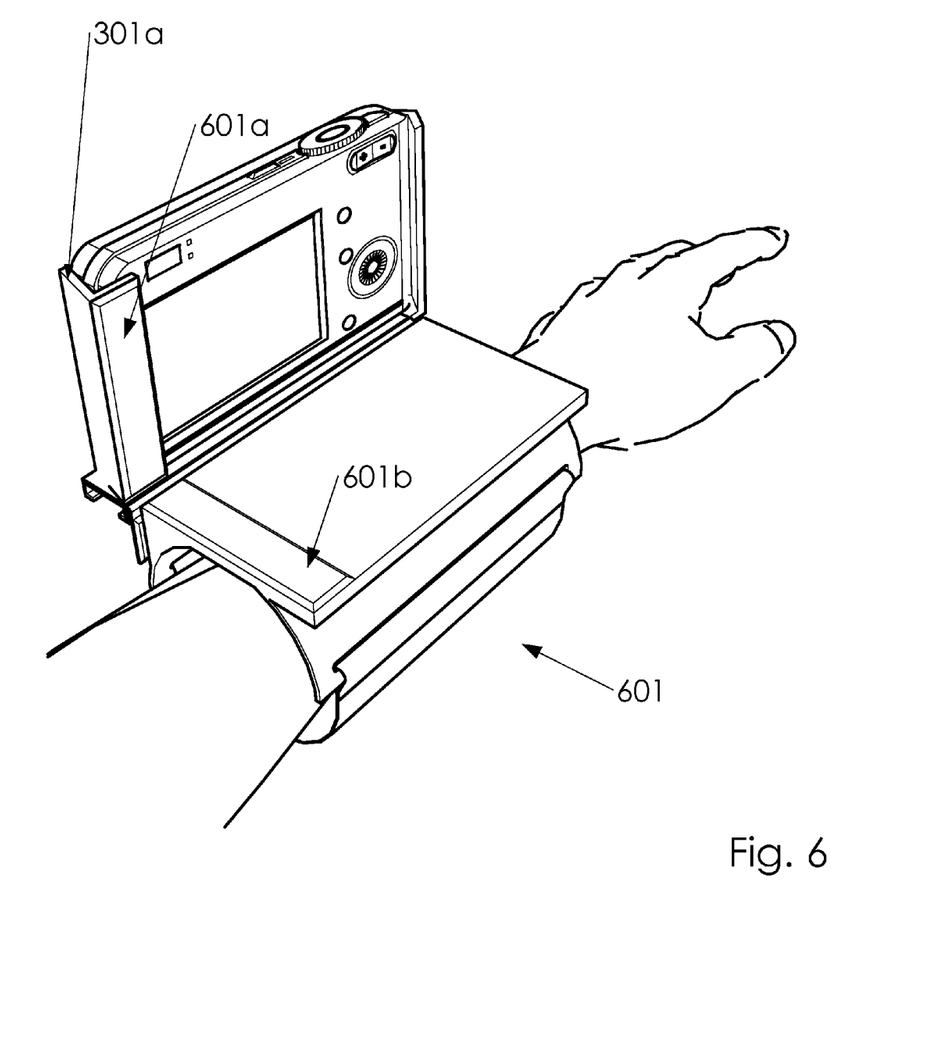
FIG. 6 illustrates camera arm mount system in an in-use position.

FIG. 6 illustrates camera arm mount system 100 FIG. 1 in an in-use position. In one embodiment, camera arm mount system 100 FIG. 1 can be configured in said in-use position wherein bracket system 102 FIG. 1 is substantially perpendicular to top surface 205 of arm mount 101 FIG. 1 . In such an embodiment, camera arm mount system 100 FIG. 1 is said to be in-use since camera 105 can be operated while in this position. The camera arm mount system 100 FIG. 1 can comprise a non-use position clasping device 601. Non-use position clasping device 601 can comprise a first portion 601a and a second portion 601b. In one embodiment, the non-use position clasping device 601 can be a one or more magnets. For example, side portion 301a can be made of a ferromagnetic material. In such embodiment, second portion 601b can comprise one or more magnets attached to arm mount 101 FIG. 1. In another embodiment, at least a portion of arm mount 101 FIG. 1 can be made of a ferromagnetic material. In such embodiment, first portion 601a can comprise of one or more magnets attached to side portion 301a. In another embodiment, non-use position clasping device 601 can comprise a plurality of magnets, one set attached to side portion 301a and the other set attached to arm mount 101 FIG. 1 . In another embodiment, clasp device 601 can be a pair of hook-and-loop fasteners, such as Velcro®, wherein first portion 601a is attached to side portion 301a and second portion 601b is attached to arm mount 101 FIG. 1, as shown in FIG. 6. In another embodiment, arm mount 101 FIG. 1 can comprise a latch that "catches" or receives side portion 301a. A person having ordinary skill in the art will recognize that there are many suitable variations of non-use position clasping device 601.

Figure 7:
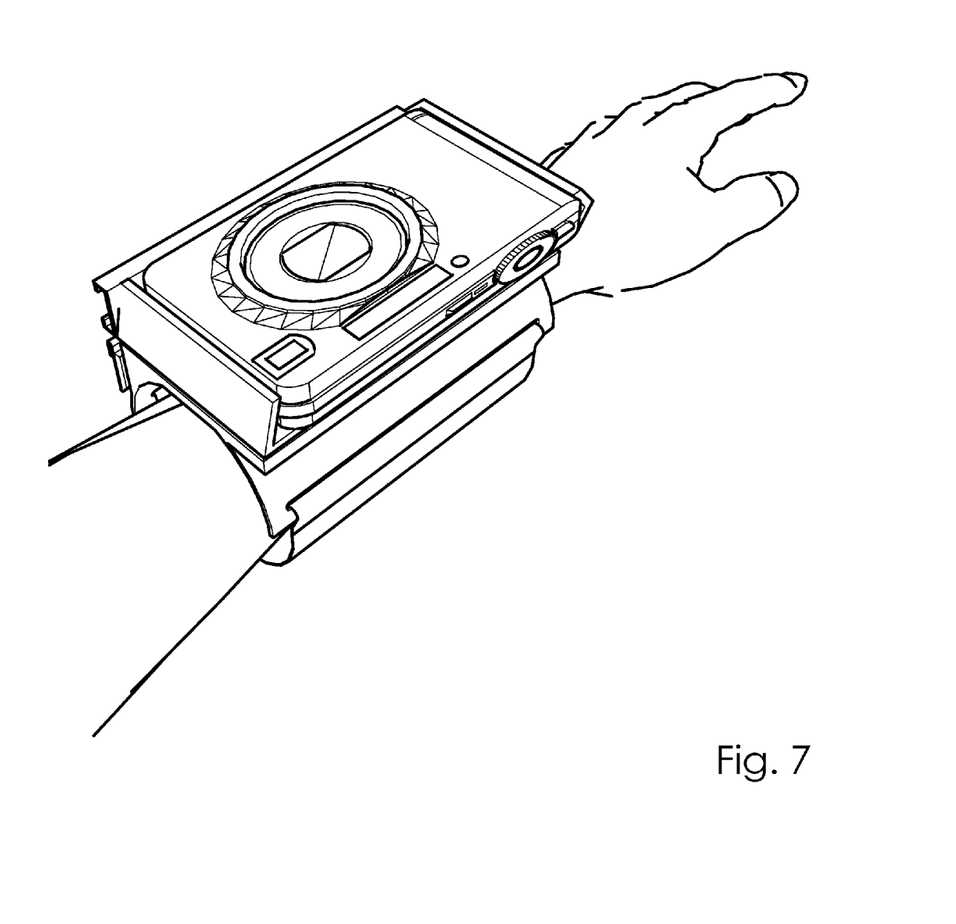
FIG. 7 illustrates camera arm mount system in a non-use position.

FIG. 7 illustrates camera arm mount system 100 FIG. 1 in a non-use position. In one embodiment, camera arm mount system 100 FIG. 1 can be configured in a non-use position wherein bracket system 102 FIG. 1 is substantially parallel to top surface 205 of arm mount 101. FIG. 1 In such an embodiment, camera arm mount system 100 FIG 1 is said to be not in use, or in said non-use position, since camera 105 is substantially stored and not in use while in this position. Placing camera 105 in a non-use position can help prevent damage to camera when it is not being used.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A camera arm mount system comprising:
 a bracket system capable of supporting a camera;
 an arm mount; and
 a hinge system comprising a clasping device having a first portion and a second portion; wherein
  said hinge system connects said bracket system and said arm mount;
  said first portion and said second portion of said clasping device are capable of selectively releasing and reattaching to one another and thereby release and reattach said bracket system and said arm mount; and
 said first portion and said second portion of said clasping device comprise magnets.

2. The camera arm mount system of claim 1 wherein said hinge system comprises a flexible portion comprising a flexible material.

3. The camera arm mount system of claim 2 wherein said flexible material comprises leather.

4. The camera arm mount system of claim 2 wherein said flexible material comprises a textile.

5. The camera arm mount system of claim 2 further comprising
a bending point in said flexible material between a first portion and a second portion of said flexible portion;
wherein said bending point serves as a pivot point for said hinge system.

6. The camera arm mount system of claim 1 wherein:
said first portion of said clasping device comprises a first end portion and a second end portion, and
said second portion of said clasping device inserts between said first end portion and said second end portion.

7. The camera arm mount system of claim 6 wherein said second portion of said clasping device comprises
a sleeve,
a first connector, and
a second connector; wherein
said first connector and said second connector insert into opposite ends of said sleeve.

8. The camera arm mount system of claim 7 further comprising:
a spring force pushing said first connector and second connector outward away from the midpoint of said sleeve;
a stop prohibiting said first connector and said second connector from sliding out of and away from said sleeve;
a first socket in said first end portion and a second socket in said second end portion, wherein said first socket and said second socket face one another and are aligned on a common axis;
a first head and a second head attached at opposite ends of said second portion of said clasping device; and
a first release paddle attached to said first connector and a second release paddle attached to said second connector, each capable of providing a grip to press the respective connectors inward toward said sleeve.

9. The camera arm mount system of claim 8 wherein said first portion and said second portion of said clasping device attach to one another by
inserting said first head into said first socket,
compressing said first connector into said sleeve,
inserting said second head into said second socket, and
releasing said first connector to allow said second portion of said clasping device to nest inside of said first portion of said clasping device.

10. The camera arm mount system of claim 8 wherein said first portion and said second portion of said clasping device release from one another by
compressing said first connector into said sleeve,
pulling said first head out of and away from said first socket,
removing said second head from said second socket, and
releasing compression from said first connector.

11. The camera arm mount system of claim 1 further comprising
an in-use position wherein said bracket system is substantially perpendicular to a top surface of said arm mount;
a non-use position wherein said bracket system is substantially parallel to said top surface of said arm mount; and
a non-use position clasping device, having a first portion attached to said bracket system and a second portion attached to said arm mount.

12. The camera arm mount system of claim 11 wherein said first portion and said second portion of said non-use position clasping device can attach to one another when said camera arm mount system is in said non-use position.

13. The camera arm mount system of claim 12 wherein said non-use position clasping device comprises two opposing strips of hook-and-loop fasteners.

14. The camera arm mount system of claim 12 wherein said non-use position clasping device comprises one or more magnets.

15. A camera arm mount system comprising:
a bracket system capable of supporting a camera;
an arm mount;
a hinge system comprising a clasping device having a first portion and a second portion;
said hinge system connects said bracket system and said arm mount;
said first portion and said second portion of said clasping device are capable of selectively releasing and reattaching to one another and thereby release and reattach said bracket system and said arm mount; and
said first portion and said second portion of said clasping device comprise opposing strips of hook-and-loop fasteners.

16. The camera arm mount system of claim 15 wherein said hinge system comprises a flexible portion comprising a flexible material.

17. The camera arm mount system of claim 15 further comprising
a bending point in said flexible material between a first portion and a second portion of said flexible portion;
wherein said bending point serves as a pivot point for said hinge system.

18. A camera arm mount system comprising:
a bracket system capable of supporting a camera;
an arm mount;
a hinge system comprising a clasping device having a first portion and a second portion;
said hinge system connects said bracket system and said arm mount;
said first portion and said second portion of said clasping device are capable of selectively releasing and reattaching to one another and thereby release and reattach said bracket system and said arm mount;
a spring force pushing said first connector and second connector outward away from the midpoint of said sleeve;
a stop prohibiting said first connector and said second connector from sliding out of and away from said sleeve;
a first socket in said first end portion and a second socket in said second end portion, wherein said first socket and said second socket face one another and are aligned on a common axis;
a first head and a second head attached at opposite ends of said second portion of said clasping device; and
a first release paddle attached to said first connector and a second release paddle attached to said second connector, each capable of providing a grip to press the respective connectors inward toward said sleeve.

19. The camera arm mount system of claim 18 wherein said first portion and said second portion of said clasping device attach to one another by
inserting said first head into said first socket,
compressing said first connector into said sleeve, inserting said second head into said second socket, and
releasing said first connector to allow said second portion of said clasping device to nest inside of said first portion of said clasping device.

20. The camera arm mount system of claim 18 wherein said first portion and said second portion of said clasping device release from one another by
compressing said first connector into said sleeve,
pulling said first head out of and away from said first socket,
removing said second head from said second socket, and
releasing compression from said first connector.

* * * * *